(12) United States Patent
Sale

(10) Patent No.: US 10,916,794 B2
(45) Date of Patent: Feb. 9, 2021

(54) WINDING APPARATUS

(71) Applicant: MANZ ITALY S.R.L., Sasso Marconi (IT)

(72) Inventor: Massimiliano Sale, Sasso Marconi (IT)

(73) Assignee: Manz Italy S.r.l. (IT)

(*) Notice: Subject to any disclaimer, the term of this patent is extended or adjusted under 35 U.S.C. 154(b) by 230 days.

(21) Appl. No.: 16/093,016

(22) PCT Filed: Apr. 18, 2017

(86) PCT No.: PCT/IB2017/052192
§ 371 (c)(1),
(2) Date: Oct. 11, 2018

(87) PCT Pub. No.: WO2017/182932
PCT Pub. Date: Oct. 26, 2017

(65) Prior Publication Data
US 2019/0140305 A1    May 9, 2019

(30) Foreign Application Priority Data
Apr. 19, 2016 (IT) .......................... 102016000040293

(51) Int. Cl.
*H01M 10/04* (2006.01)
*H01G 13/02* (2006.01)

(52) U.S. Cl.
CPC ........ *H01M 10/0409* (2013.01); *H01G 13/02* (2013.01); *H01M 10/0431* (2013.01)

(58) Field of Classification Search
CPC .......... H01M 10/0409; H01M 10/0431; H01G 13/02; B65H 23/005; B65H 23/28; B65H 2701/1918
See application file for complete search history.

(56) References Cited

U.S. PATENT DOCUMENTS

| | | | | |
|---|---|---|---|---|
| 1,385,379 | A * | 7/1921 | Kratz | H01G 13/02 361/303 |
| 2,944,753 | A | 7/1960 | Odell et al. | |
| 3,572,603 | A * | 3/1971 | Whiteman | H01F 41/063 242/547 |
| 3,623,918 | A * | 11/1971 | Cailley | H01M 10/28 29/623.1 |

(Continued)

FOREIGN PATENT DOCUMENTS

| | | |
|---|---|---|
| DE | 901418 | 7/1962 |
| DE | 102011075063 A1 | 11/2012 |

(Continued)

*Primary Examiner* — Emmanuel M Marcelo
(74) *Attorney, Agent, or Firm* — Laubscher & Laubscher, P.C.

(57) ABSTRACT

A winding apparatus that produces electrical energy storage devices includes a rotatable winding core on which two electrode strips and two separator strips are wound, strip guides which guide the various strips along feeding paths, and at least one rotatable and/or slidable portion that supports at least one strip guide. The rotatable and/or slidable portion rotates and/or slides, respectively, to adjust the position of the respective strip according to an increase in the diameter of the wound product in order to have the desired insertion direction of the strip with respect to the peripheral surface of the product.

20 Claims, 3 Drawing Sheets

(56) References Cited

U.S. PATENT DOCUMENTS

| | | | | |
|---|---|---|---|---|
| 4,520,965 A * | 6/1985 | Kimura | ............... | H02K 15/09 |
| | | | | 242/433.3 |
| 5,700,299 A * | 12/1997 | Clark | ............... | H01M 6/10 |
| | | | | 156/446 |
| 5,849,431 A * | 12/1998 | Kita | ............... | H01M 2/0202 |
| | | | | 429/164 |
| 6,375,113 B1 * | 4/2002 | Ishimaru | ............... | H01F 41/082 |
| | | | | 242/445.1 |
| 9,373,865 B2 * | 6/2016 | Holl | ............... | B23K 26/38 |
| 2005/0242227 A1 * | 11/2005 | Takeda | ............... | H01F 41/077 |
| | | | | 242/476.7 |
| 2009/0127373 A1 * | 5/2009 | Uozumi | ............... | B29C 53/602 |
| | | | | 242/436 |
| 2010/0281685 A1 | 11/2010 | Hori et al. | | |
| 2012/0084979 A1 * | 4/2012 | Viavattine | ............... | H01M 2/26 |
| | | | | 29/874 |
| 2014/0197266 A1 * | 7/2014 | Izumida | ............... | B65H 18/26 |
| | | | | 242/547 |
| 2018/0215568 A1 * | 8/2018 | Sato | ............... | B65H 20/02 |

FOREIGN PATENT DOCUMENTS

| | | | | |
|---|---|---|---|---|
| JP | H0574446 A | | 3/1993 | |
| KR | 20100113111 A * | | 10/2010 | ........ H01M 10/0431 |

\* cited by examiner

WINDING APPARATUS

CROSS-REFERENCE TO RELATED APPLICATIONS

This application is a § 371 National Stage Entry of PCT/IB2017/052192 filed Apr. 18, 2017. PCT/IB2017/052192 claims priority of IT 102016000040293 filed Apr. 19, 2016. The entire contents of these applications are incorporated herein by reference.

BACKGROUND OF THE INVENTION

The invention relates to a winding apparatus, in particular for winding a plurality of electrode or separator strips on a rotating core in the production of electrical energy storage devices.

The invention can be applied to the production of electrical energy storage devices of the "jelly roll" or "spiral wound" type, for example, cylindrical or oval batteries or capacitors.

In the production of jelly roll batteries, it is known to slide the strips of electrodes and separators along various feeding paths that all converge on a rotatable winding core. It is desirable to wind the strips in a continuous, ordered and regular manner to ensure the formation of a high quality product of the desired shape that is compact and uniform. In particular, it is desirable to avoid the risk of misaligning the various winding coils of the strips, which would result in a faulty final wound product, for example a product having opposite end surfaces of irregular shape, which are not perfectly flat and undulate or are untidy.

The US patent application publication No. 2010/281685 A1 discloses detecting units that adjust positions of electrodes and separators between two positions in which electrodes and separators are stacked before being wound around a winding shaft.

The Ikuo JP patent No. H0574446 discloses an apparatus including angle variable rollers and position detecting sensors coupled with the feeders of electrodes, wherein the tilting angle of the rollers is controlled based on the sensor output in view of the winding around a spindle.

The Siemens GB patent No. 901418 A discloses an apparatus and method for producing a roll capacitor.

SUMMARY OF THE DISCLOSURE

Accordingly, it is an object of the present disclosure to provide an apparatus that winds strips in a continuous, orderly and regular manner, ensuring the formation of a high quality product precisely formed to a desired shape that is compact and uniform, has perfect alignment of various winding coils of the strips, and that avoids irregularities of the wound product, for example, opposite end surfaces of irregular shape.

It is further an object of the present disclosure to provide a winding apparatus in which a strip wound on a rotatable winding core has a desired orientation relative to the periphery of the product being wound, taking into account the gradual accumulation of the product around the core and consequent progressive variation of the diameter thereof.

It is additionally an object of the present disclosure to avoid winding irregularities that are due, in particular, to an increasing diameter of the wound product, which progressively varies the configuration of the product and could cause a strip to exit from the sliding guide or cause a strip to deviate from the predefined path, risking malformation of the wound product.

Another object is to provide a simple and inexpensive winding apparatus for winding strips which provides high productivity and is suitable for the production of high quality electrical energy storage devices.

In one embodiment, a winding apparatus includes a rotatable winding core on which at least one strip is wound, in particular at least one electrode strip, in which the strip advances along a pre-set feeding path to the core by sliding on a strip guide. The apparatus includes at least one rotatably movable portion that partially supports the strip guide and which, during winding, performs an adjusting rotation movement according to the progressive variation of the diameter of the product that is being formed on the winding core, in order to insert the strip into the product being wound with a desired direction.

The winding apparatus may include, in particular, at least a first and second electrode guide configured to guide a first and second electrode strip, respectively, and at least a first and second separator guide configured to guide a first and second separator strip, respectively. The aforesaid guides are capable of performing at least one adjusting movement via at least one electric cam.

BRIEF DESCRIPTION OF THE DRAWINGS

The invention can be better understood and implemented with reference to the attached drawings that illustrate one embodiment thereof by way of non-limiting example, in which.

DETAILED DESCRIPTION

Figure 1:
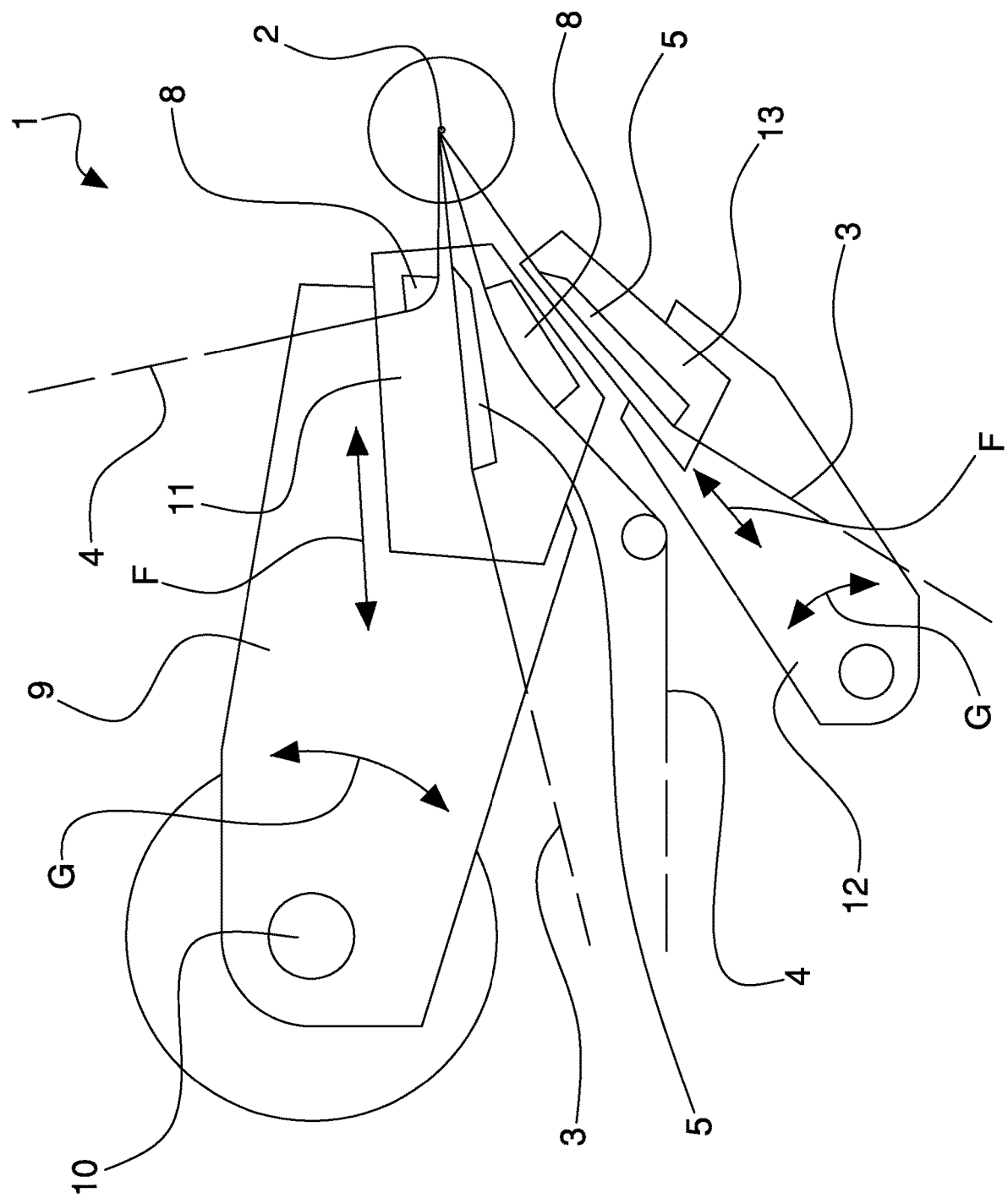
FIG. 1 is a lateral partial schematic view of one embodiment of a winding apparatus made according to the present disclosure.
Figure 2:
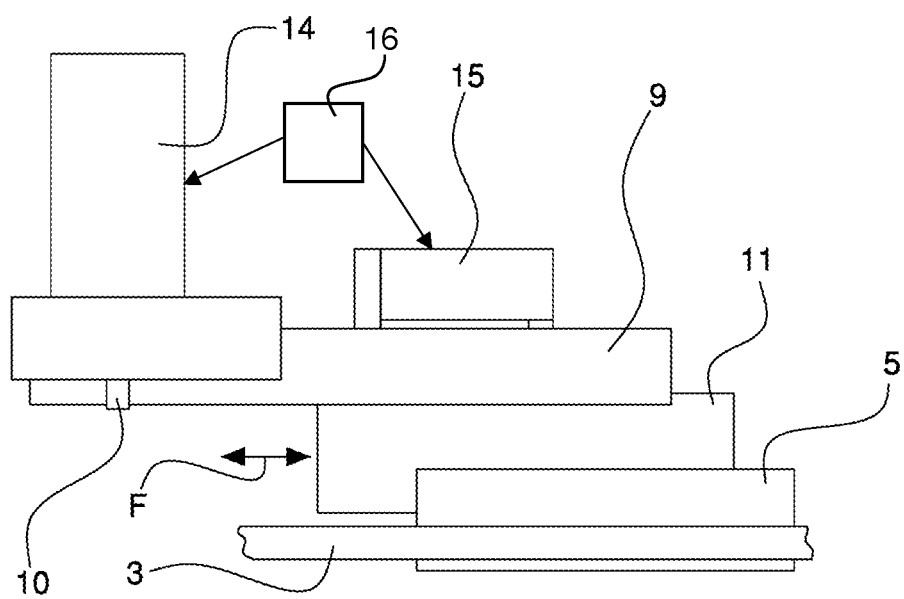
FIG. 2 is a top schematic view of a detail of the winding apparatus of FIG. 1 that includes the adjusting system for adjusting the position of a strip at the inlet of the winding core.
Figure 3:
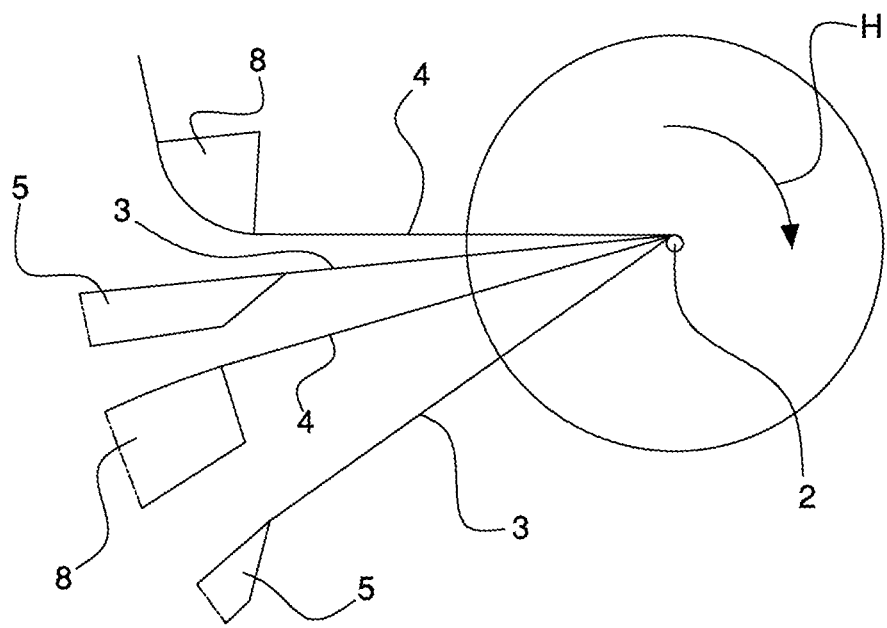
FIG. 3 shows an enlarged detail of FIG. 1.
Figure 5:
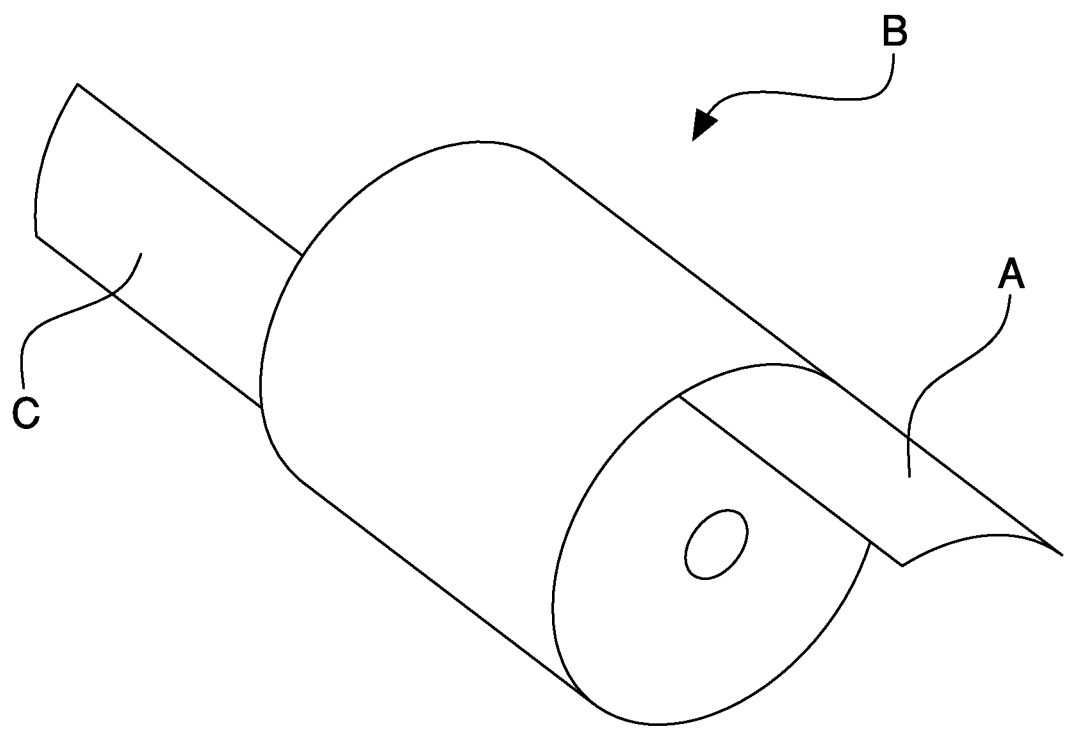
FIG. 5 is a perspective view of one embodiment of a wound product that is formed by the winding apparatus of FIG. 1.

FIGS. 1-3 show a winding apparatus for winding one or more strips on themselves to form a wound product, such as an electrical energy storage device. In particular, the apparatus can produce cylindrical or oval rechargeable batteries known as "jelly rolls". FIG. 5 shows one embodiment of a wound finished product B formed by the winding apparatus 1. The wound product B includes a cylindrical rechargeable jelly roll battery, formed by the winding of two electrode strips alternating with two separator strips. The first electrode strip forms a first tab C, or cathode, at one end and the second electrode strip forms a second tab A, or anode, at another end.

The winding apparatus 1 includes at least one winding core or spindle 2 on which the product is wound. The core 2 is generally cylindrical and rotatable in a direction H about a fixed rotation axis via a programmable electronically controlled motor. The final wound product has a cylindrical configuration, however in other embodiments it could have a different shape. The core 2, as shown in FIGS. 1 and 2, is arranged for winding two electrode strips 3 and two separator strips 4. It will be understood by those with skill in the art that other numbers and types of strips could be used to form the final product.

Figure 4:
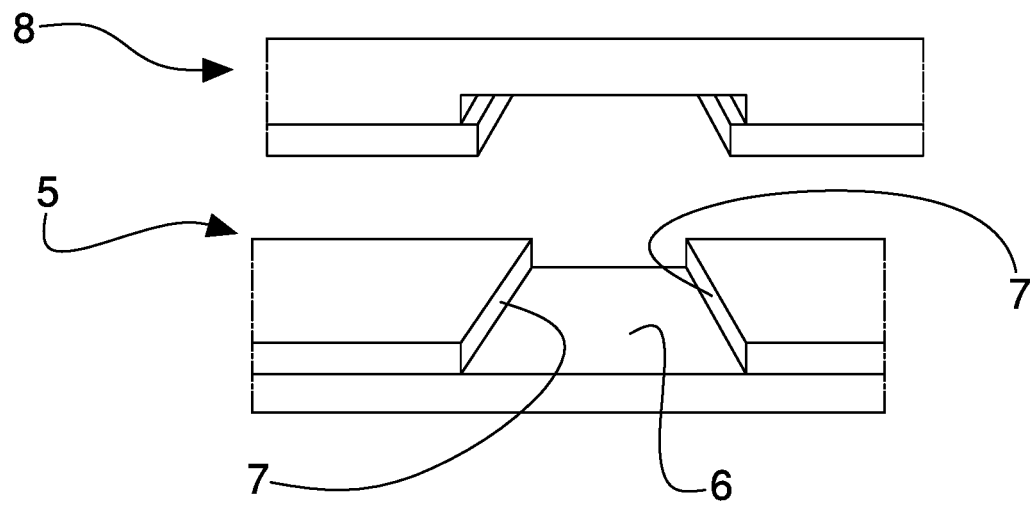
FIG. 4 is a front view of a detail of the winding apparatus of FIG. 1 that includes the strip guide.

The winding apparatus 1 includes first and second electrode guides 5 arranged for guiding first and second electrode strips 3, respectively, to the core 2. FIG. 4 shows in detail one embodiment of an electrode guide 5, which includes a flat sliding surface 6 of the strip 3 bounded laterally by two walls 7 that extend vertically from the surface 6 for guiding and containing the strip 3.

The winding apparatus 1 includes first and second separator guides 8 arranged for guiding first and second separator strips, respectively, to the core 2. Each separator guide 8 includes one strip guide substantially similar to the electrode guide 5, for example, a guide similar to the one illustrated in FIG. 4.

While winding the strips 3 and 4 around the core 2, each electrode guide 5 and/or each separator guide 8 can perform at least one rotation and/or translation movement with respect to the core 2 in order to adjust the position of the respective electrode strip 5 and/or of the respective separator strip 8. Adjustments may be used to vary the position of at least one part of the strip guide, and consequently the entry direction of the strip, depending on the degree to which the diameter of the product is increased during winding.

The winding apparatus 1 further includes a first rotatable portion 9 that is capable of performing at least one rotation G, as shown in FIG. 1, around a rotation pin 10 to adjust the position of at least one strip 3 or 4. The rotation axis of the first rotatable portion 9 is perpendicular to the feeding path of at least one strip 3 or 4 and is parallel to the rotation axis of the winding core 2.

As shown in FIGS. 1 and 3, the feeding paths of the electrode strips 3 and/or of the separator strips 4 are coplanar to one another and are arranged on a plane that is perpendicular to the rotation axis of the core 2.

The first rotatable portion 9 supports the first electrode guide 5 and/or the first separator guide 8 so that either approaches or moves away from the core 2. The second separator guide 8 is also supported by the first rotatable portion 9.

Referring again to FIGS. 1-3, there is a first slidable portion 11 that is capable of performing at least one slide in a linear direction F to adjust the position of at least one strip 3 or 4. The movement of the first slidable portion 11 includes a translation on a plane, for example a rectilinear translation.

The first slidable portion 11 supports the first electrode guide 5 and/or the first separator guide 8 so that either approaches or moves away from the core 2. The first slidable portion is supported by the first rotatable portion.

During winding, the guides can be rotated, translated and/or rotated and translated with respect to the rotation axis of the core 2, for example towards or away therefrom, in particular to maintain a variable or constant distance between the guides 5 and 8 and the periphery of the product being wound.

A second rotatable portion 12 performs one rotation in the direction G to move the second electrode guide 5 toward or away from the core 2. A second slidable portion 13 also moves the electrode guide toward or away from the core 2 in a linear direction F. The second slidable portion 13 is supported by the second rotatable portion 12.

The first slidable portion 11 supports the first electrode guide 5 and the two separator 8 guides, whereas the second slidable portion 13 supports the second electrode guide 5 of the second electrode strip.

As the diameter of the wound product increases during winding, the guides 5 and 8 can be rotated, translated and/or roto-translated with respect to the axis of the core 2, to vary the position of the guides 5 and 8 depending on the variation of the dimensions of the product being wound. Adjustment of the position of a strip guide maintains alignment of the various product winding coils and/or maintains each strip within the respective guide.

The first 9 and second 12 rotatable portions are driven by two first electric motors 14, respectively, which are fixed to a frame of the winding apparatus 1. The first 11 and second 13 slidable portions are driven by two second electric motors 15, respectively. One of the second motors 15 is supported by the first rotatable portion 9 and is connected with the first slidable portion 11 to transmit motion, for example to transform a rotation of a rotor of the second motor 15 into linear movement of the first slidable portion 11. The other motor of the second motor 15 is supported by the second rotatable portion 12 which is connected with the second slidable portion 13 to transmit motion, for example to transform a rotation of a rotor of the second motor 15 into linear movement of the second slidable portion 13.

The first 11 and second 13 slidable portions include first and second slides, respectively, and the first 9 and second 12 rotatable portions include first and second rotating arms, respectively. The first and second rotating arms support the first, and second slides, respectively, which are coupled with the first and second rotating arms by the first and second sliding guides, respectively.

As discussed above, each electrode guide 5 and/or each separator guide 8 is capable of performing at least two position adjusting movements with respect to the core 2. The two movements may be transverse to one another and may include at least one rotation G and at least one translation F. The movements are driven by two electric motors 14 and 15.

In another embodiment, the winding apparatus 1 includes a programmable electronic controller 16 provided with computer program instructions and connected with the electric motors 14 and 15 for controlling the movements on the basis of a thickness of the first and/or second electrode strip 3 and/or of the first and/or second separator strip 4. These thicknesses will determine the diameter of the wound product.

The thicknesses of the various strips 3 and 4 may be entered in an electronic memory and then the controller 16 may determine, on the basis of these thicknesses, the appropriate movements of the various moveable portions 9, 11, 12, 13, which are driven by the various motors 14 and 15 to adjust the position of the strips 3 and 4 in the rotating winding core 2. Specifically, so that the entry position of the strips 3 and 4 is adjusted according to the variation of the dimensions of the product being wound, for instance, as the dimensions gradually increase during winding.

Adjusting the strip entry position maintains the desired strip tension and secures the strips being guided to prevent undesired misalignments of the strips with respect to the rotating core 2, which has a fixed rotation axis. The correct strip entry position, which is suitable for maintaining the desired tension of the strips and for ensuring the guided feeding of the strips, may be determined empirically.

The electrode strips 3 and separator strips 4 may be unwound from respective reels (not shown). Each feeding path feeding the strips 3 and 4 may include different elements that are coupled with the strips, such as idle, rotatable guide rollers, fixed sliding guides, guide pulleys, etc. Each electrode strip 3 and separator strip 4 may advance along the feed path via the rotation of the core 2.

In the embodiments disclosed above, the adjusting movement for adjusting the strip entry position includes at least one rotation direction G and/or at least one translation direction F of the strip guide. It Is nevertheless possible to provide an adjusting movement that may include a more complex movement in a plane or in space, in which the guides are moved gradually during winding with respect to the fixed rotation axis of the core as the wound product is formed.

In the embodiments disclosed above, there are two electrode strips 3 and two separator strips 4. It is nevertheless possible to wind a greater or lesser number of strips, for example, to form a product by winding two strips, each of which include an electrode strip configured so as to also act as a separator.

Although the above description with reference to particular embodiments, it is to be understood that these embodiments are merely illustrative of the principles and applications of the present disclosure. It Is therefore to be understood that numerous modifications may be made to the illustrative embodiments and that other arrangements may be devised and employed without departing from the spirit and scope of the present disclosure.

The invention claimed is:

1. A winding apparatus comprising:
   (a) at least one rotatable core about which an electrode strip is wound;
   (b) at least one first electrode guide configured to guide a first electrode strip to said core; and
   (c) a moving device connected with said at least one first electrode guide and configured to perform at least one movement relative to said core, whereby when the first electrode strip is being wound about said core, said moving device varies the position of the first electrode strip relative to the position of said core according to a variation of at least one dimension of a product wrapped on said core.

2. The winding apparatus according to claim 1, further comprising at least one second electrode guide configured to guide a second electrode strip to said core.

3. The winding apparatus according to claim 2, wherein said moving device is connected with said second electrode guide and is configured to perform a movement for varying the position of the second electrode strip relative to said core according to a variation of at least one dimension of the product wrapped on said core.

4. The winding apparatus according to claim 3, wherein said moving device comprises:
   (a) at least one first movable portion which supports said at least one first electrode guide and which performs at least one movement for adjusting the position of said at least one first electrode guide relative to said core;
   (b) at least one second movable portion which supports said at least one second electrode guide and which performs at least one movement for adjusting the position of said second electrode guide relative to said core; and
   (c) two motors each configured to independently operate said at least one first movable portion and said at least one second movable portion, respectively.

5. The winding apparatus according to claim 1, further comprising at least one first separator guide configured to guide a first separator strip to said core, said moving device being connected with said separator guide and being configured to perform a movement for varying the position of the first separator strip relative to said core according to a variation of at least one dimension of the wrapped product.

6. The winding apparatus according to claim 5, further comprising at least one second separator guide configured to guide a second separator strip to said core, said moving device being connected with said second separator guide and being configured to perform a movement for varying the position of the second separator strip relative to said core according to a variation of at least one dimension of the wrapped product.

7. The winding apparatus according to claim 1, wherein said moving device comprises at least one first rotatable portion which supports said at least one first electrode guide and which performs at least one rotation for movement of said at least one first electrode guide relative to said core.

8. The winding apparatus according to claim 7, wherein said at least one first rotatable portion supports said at least one first separator guide and which performs at least one rotation for movement of a first separator strip to said core.

9. The winding apparatus according to claim 8, wherein said at least one first rotatable portion supports at least one second separator guide and which performs at least one rotation for movement of a second separator strip to said core.

10. The winding apparatus according to claim 7, wherein said moving device further comprises at least one second rotatable portion which supports at least one second electrode guide and which performs at least one rotation for movement of said at least one second electrode guide relative to said core.

11. The winding apparatus according to claim 10, wherein said moving device comprises at least one second slidable portion which supports at least one second electrode guide and which performs at least one translation movement for movement of said at least one second electrode guide relative to said core.

12. The winding apparatus according to claim 1, wherein said moving device comprises at least one first slidable portion which supports at least one first separator guide and which performs at least one translation movement for movement of a first separator strip to said core.

13. The winding apparatus according to claim 12, wherein said at least one first slidable portion supports at least one second separator guide and which performs at least one translation movement for movement of a second separator strip to said core.

14. The winding apparatus according to claim 1, wherein said moving device comprises a first slidable portion supported by a first rotatable portion.

15. The winding apparatus according to claim 1, wherein said moving device comprises a first rotatable portion supported by a first slidable portion.

16. The winding apparatus according to claim 1, wherein said moving device is configured to perform at least two movements for adjusting the position of said at least one first electrode guide relative to said core, said two movements being transverse relative to one another.

17. The winding apparatus according to claim 16, wherein said at least two movements include one of rotating and translating.

18. The winding apparatus according to claim 17, wherein said moving device comprises at least two motors each configured to independently drive one of said at least two movements to adjust the position of the first electrode strip during formation of the wrapped product.

19. The winding apparatus according to claim 1, wherein a programmable electronic controller provided with computer program instructions controls said at least one movement according to at least one thickness of the first electrode strip.

20. A method for producing electrical energy storage devices using the winding apparatus defined in claim 1.

* * * * *